(12) United States Patent
Nelson et al.

(10) Patent No.: US 9,213,367 B1
(45) Date of Patent: Dec. 15, 2015

(54) KIT FOR SHIPPING AN ELECTRICAL CABINET

(75) Inventors: Laura E. Nelson, Hudson, MA (US); Richard D. Connelly, Pepperall, MA (US); Todd J. McBride, Douglas, MA (US); Matthew B. Popieniuck, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 846 days.

(21) Appl. No.: 12/649,373

(22) Filed: Dec. 30, 2009

(51) Int. Cl.
*B65D 71/00* (2006.01)
*G06F 1/16* (2006.01)

(52) U.S. Cl.
CPC .................................. *G06F 1/1628* (2013.01)

(58) Field of Classification Search
CPC ........... B65D 2519/00273; B65D 2519/00159; B65D 2519/00497; G06F 1/1628
USPC ......... 206/320, 386, 600, 597, 595, 596, 598, 206/599, 223, 576; 108/52.1, 57.16, 57.17, 108/57.21, 57.25, 56.3, 51.3, 25, 34; 414/537, 545; 14/71.1, 69.5
See application file for complete search history.

(56) References Cited

U.S. PATENT DOCUMENTS

| | | | | |
|---|---|---|---|---|
| 3,696,988 A * | 10/1972 | Nederveld | ..................... | 206/386 |
| 4,454,946 A * | 6/1984 | Yokowo | ........................ | 206/600 |
| 4,606,461 A * | 8/1986 | Bolton, Sr. | ..................... | 206/600 |
| 4,911,084 A * | 3/1990 | Sato et al. | .................. | 108/57.17 |
| 5,318,219 A * | 6/1994 | Smith | ...................... | 229/117.05 |
| 5,505,140 A * | 4/1996 | Wittmann | .................. | 108/51.11 |
| 5,743,422 A * | 4/1998 | Hale | ............................ | 220/4.33 |
| 5,842,424 A * | 12/1998 | Prevot et al. | ................. | 108/54.1 |
| 5,934,474 A * | 8/1999 | Renninger et al. | ........... | 206/600 |
| 6,035,790 A * | 3/2000 | Polando | ........................ | 108/55.1 |
| 6,105,511 A * | 8/2000 | Bridges | ....................... | 108/55.3 |
| 6,769,368 B2 * | 8/2004 | Underbrink et al. | ......... | 108/55.3 |
| 7,258,384 B2 * | 8/2007 | Drabik et al. | ................... | 296/61 |
| 7,290,664 B2 * | 11/2007 | Kono et al. | .................... | 206/600 |
| 2006/0278549 A1 * | 12/2006 | Kono et al. | .................... | 206/386 |
| 2008/0000397 A1 * | 1/2008 | Dickinson et al. | ........... | 108/55.3 |

* cited by examiner

*Primary Examiner* — Jacob K Ackun
*Assistant Examiner* — Jenine Pagan
(74) *Attorney, Agent, or Firm* — Krishnendu Gupta; Konrad R. Lee

(57) ABSTRACT

A kit for providing shipping cartons and apparatus used to transport electrical cabinets between a seller and a buyer. The kit includes: a pallet for supporting the cabinet; and a pair of scored panels. The panels are folded along the scores into a pair of flat units disposed over the pallet. The scores are arranged to provide, when the units are unfolded, a pair of opposing outer U-shaped side covering for the cabinet. Stacked engageable ramp-like members are disposed over the pallet to form, when engaged, an elongated ramp. The kit includes a pair of opposing outer U-shaped side members disposed about: sides of the pallet; side of the pair of folded panels; and sides of the ramp-like members to provide sidewalls of shipping package for the kit.

7 Claims, 11 Drawing Sheets

KIT FOR SHIPPING AN ELECTRICAL CABINET

TECHNICAL FIELD

This disclosure relates generally to shipping kits and more particularly to kits for providing shipping cartons and apparatus used to transport electrical cabinets between a seller and a buyer.

BACKGROUND

As is known in the art, it is sometimes necessary for a buyer to return to a seller's factory, as for repair or return, a large electrical cabinet, such as are used to house electrical components as in a data storage system. These electrical cabinets can be relatively tall and heavy. For example, the cabinet may be 78 inches in height and could weigh 2800 lbs. Today, if the seller were to ship an empty cabinet package out to the buyer packaging large enough to accommodate the height of the cabinet, the seller would be charged at dimensional weight rates for shipping a very large, light weight (i.e., empty) package. Further, these cabinets are relatively heavy. In shipping the cabinet, it is highly desirable to rest the cabinet on a pallet. It is also desirable to mount some type of shock absorbing members under the pallet; i.e., raise the pallet from the floor of a truck used to ship the packaged cabinet back to the buyer. Further, in order to move the cabinet upwards/downwards onto/off the raised pallet, a ramp-like structure must generally be used.

SUMMARY

In one embodiment, a kit is disclosed for providing a shipping carton and apparatus used to transport an electrical cabinet between a seller and a buyer. The kit includes: a pallet for supporting the cabinet; and a pair of scored panels. The panels are folded along the scores into a pair of flat units disposed over the pallet. The scores are arranged to provide, when the units are unfolded, a pair of opposing outer U-shaped side covering for the cabinet. The kit includes a plurality of stacked ramp-like members disposed over the pallet, one of such ramp-like members having one end engageable with one end of the pallet and an opposite end engageable with one end of another one of the ramp-like members to form, when engaged, an elongated ramp.

In one embodiment, the kit includes a pair of opposing outer U-shaped side members disposed about: sides of the pallet; sides of the pair of scored panels; and sides of the plurality of ramp-like members to provide sidewall portions for the kit.

In one embodiment, the kit includes a top member or cover having a top surface and four side surfaces, the top member being disposed over: the pallet; the pair of scored panels; and the plurality of ramp-like members, the top member having sides disposed on side portions of the pair of opposing outer U-shaped side member to provide a top cover for the kit.

With such an arrangement, a kit includes components to provide both a shipping carton and apparatus for transporting an electrical cabinet between a seller and a buyer. The kit has a height only a small fraction of the actual height of the cabinet. Thus, in the case where the buyer is returning the cabinet to the seller, the seller sends to the buyer the kit and in the case where the seller initially transports the package cabinet to the buyer, the buyer returns to the seller the kit for reuse by the seller, for example.

In one embodiment, the kit includes a 2 piece, foldable sleeve (i.e., panel) and a two-piece ramp so all component parts can fit within the pallet footprint but in a compact height. The sleeves (i.e., panels) are designed to be fully self-supporting when erected (i.e., unfolded).

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1A:
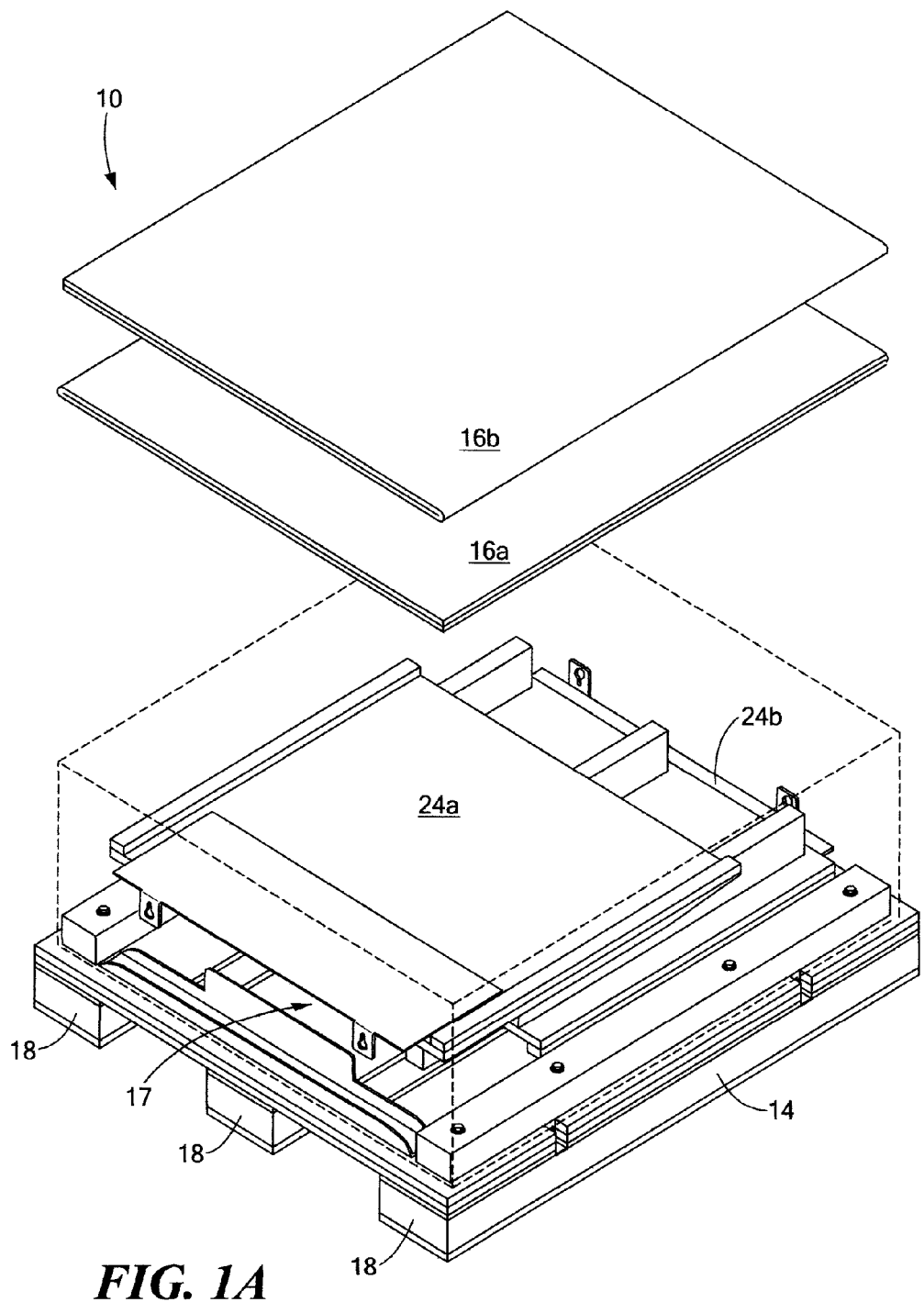
FIG. 1A is a partially exploded view of a portion of a kit according to the invention.
Figure 1B:
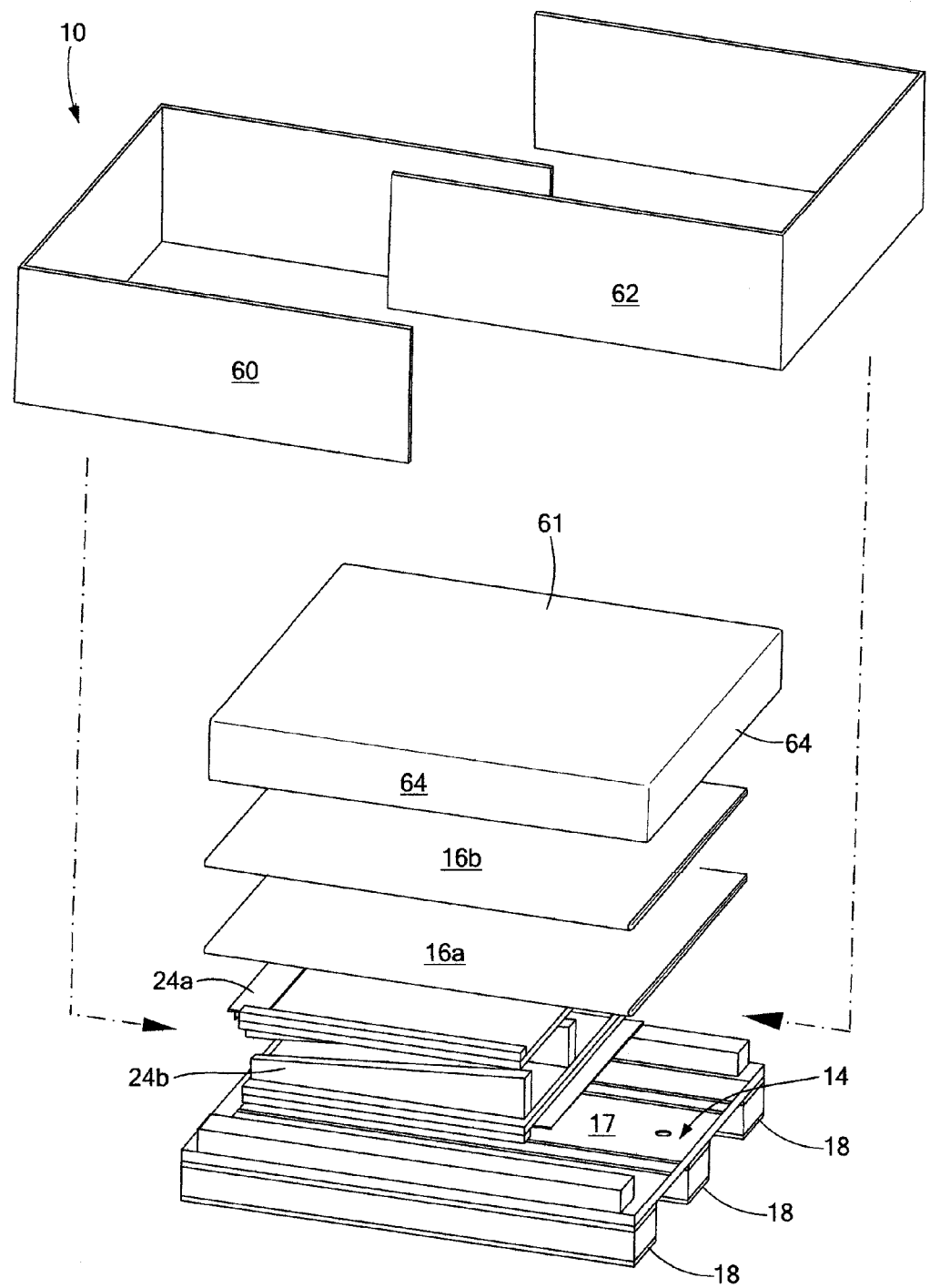
FIG. 1B is an exploded view of a portion of a kit according to the invention.
Figure 1C:
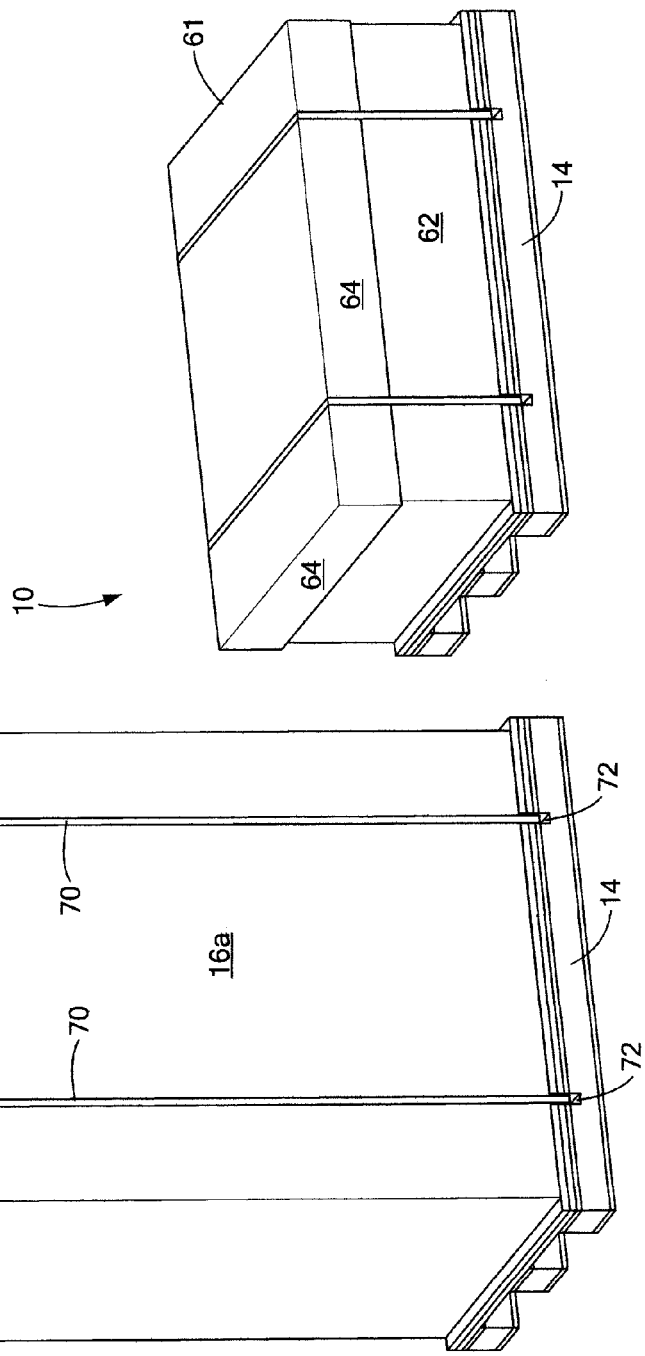
FIG. 1C is a side-by-side comparison of the kit of FIG. 1B along side of a shipping carton for an electrical cabinet, such carton being constructed from the kit of FIG. 1B.

Referring now to FIGS. 1A, 1B and 1C, a kit 10 is shown for providing a shipping carton and apparatus to transport an electrical cabinet 12 (FIG. 2) between a seller and a buyer. In one case, the cabinet 12 is to be transported by the buyer back to (i.e., returned to) the seller, for repair, for example, and in another case the cabinet 12 is shipped to the seller with the buyer returning the kit back to the seller, for example.

Figure 3:
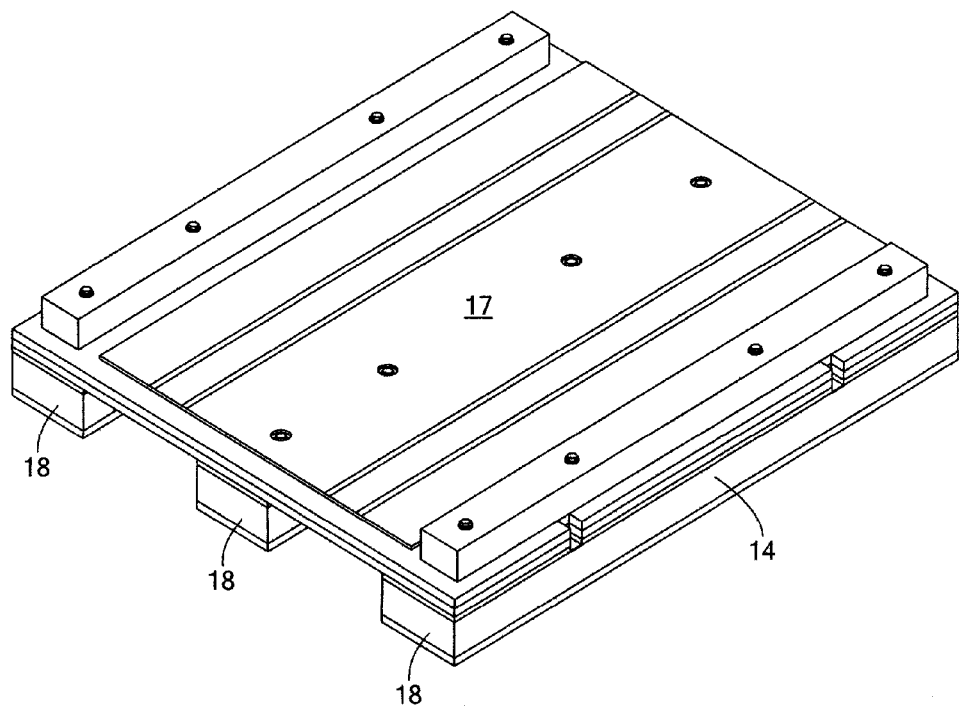
FIG. 3 is a perspective view of a pallet portion of the kit.
Figure 4:
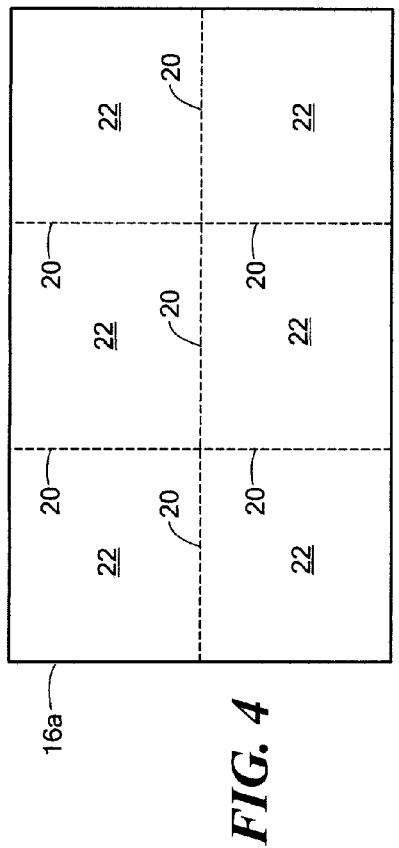
FIG. 4 is a plan view of a side panel of the kit prior to being folded.

The kit 10 is boxed in a manner to be described and includes: a pallet 14 for supporting the cabinet 12 when the cabinet is being transported between the buyer and the seller; and a pair of scored panels 16a, 16b. The pallet 14 (FIG. 3) has a wooded surface 17 and three spaced rails 18 of shock absorbing members attached to the bottom of surface 17, as shown in FIG. 3. The rails 18 include any mechanical shock absorbing material, such as polyethylene foam, for example;

The panels 16a, 16b are shown folded in FIGS. 1A and 1B. Each one of the panels 16a, 16b is identical in construction, an exemplary one of the panels, here panel 16a being shown in an unfolded, flatted condition on FIG. 4. The panel 16a is corrugated cardboard material as is typically used in shipping cartons. Here, the panel 16a includes score lines (i.e., scores) 20, to divide the panel 16a into six sections 22 having the same surface area. When folded, as shown in FIG. 1, they are placed over the pallet 14, as indicated in FIG. 1.

Figure 2:
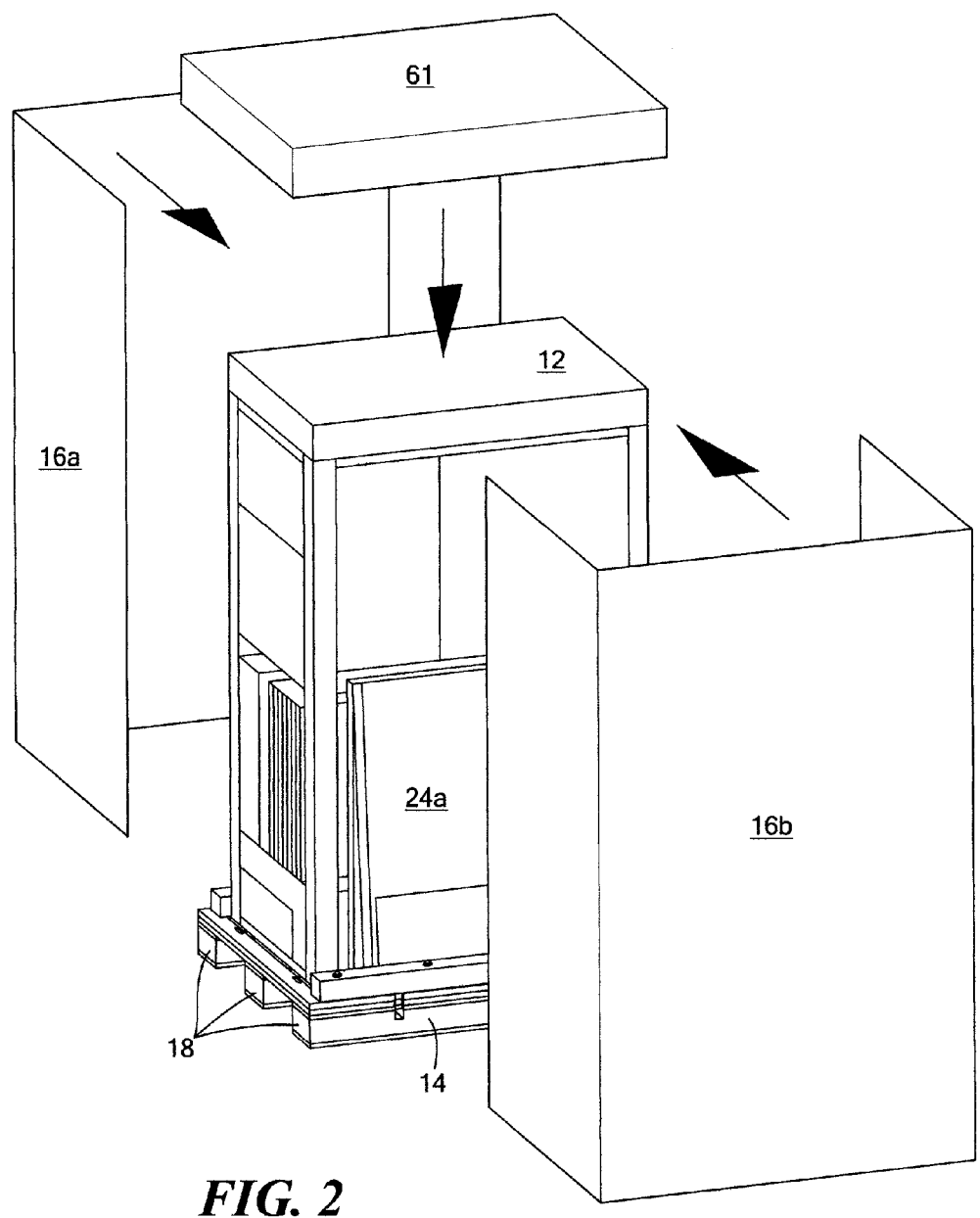
FIG. 2 is an exploded view of the kit of FIG. 1B configured for containing an electrical cabinet for shipment between a buyer and a seller.

The scores 20 are arranged to provide, when the panels 16a, 16b (sometimes referred to as units) are unfolded, (FIG. 2), a pair of opposing outer U-shaped side covering for the cabinet, as shown in FIG. 2.

Figure 6:
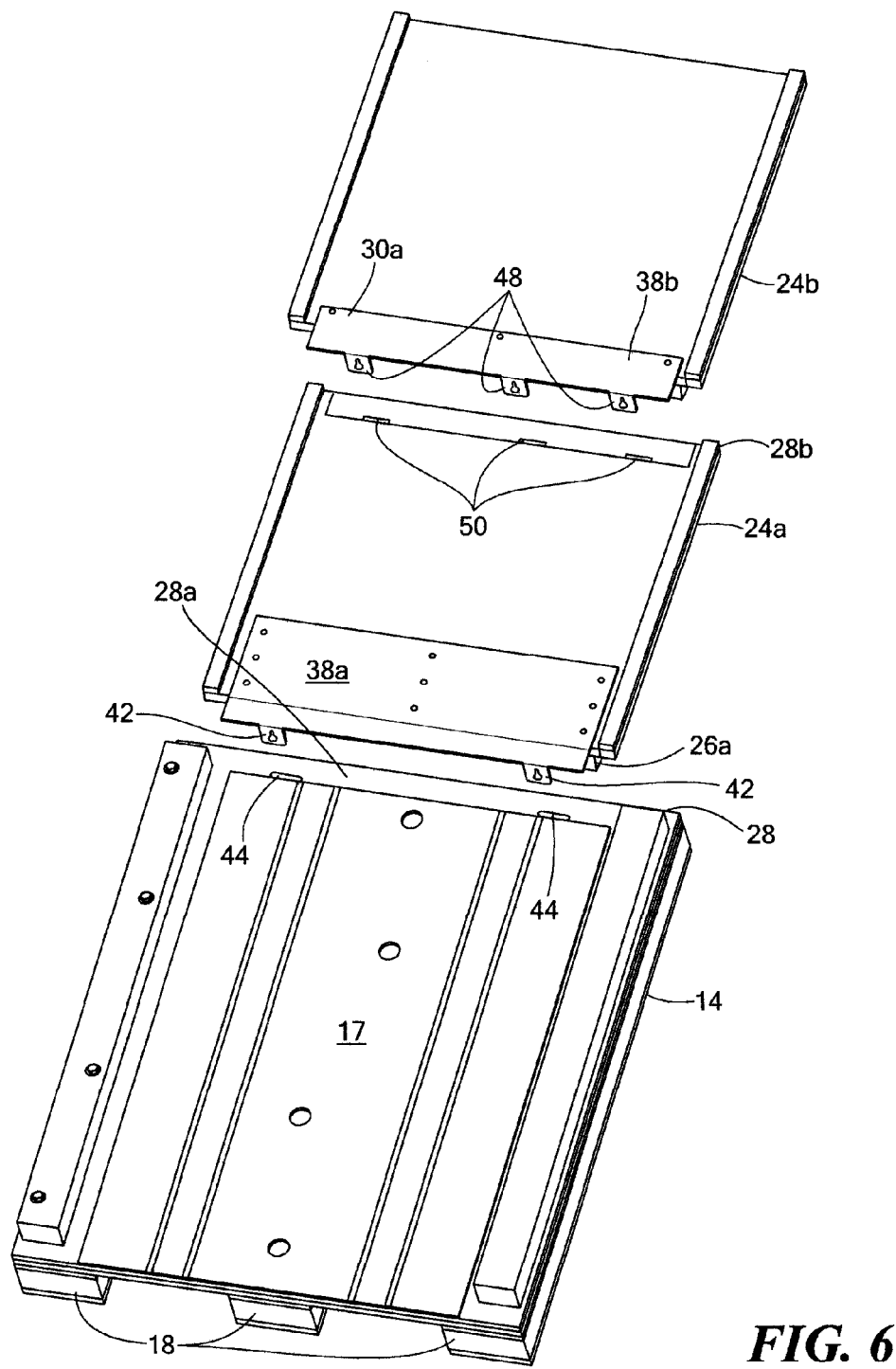
Figure 7:
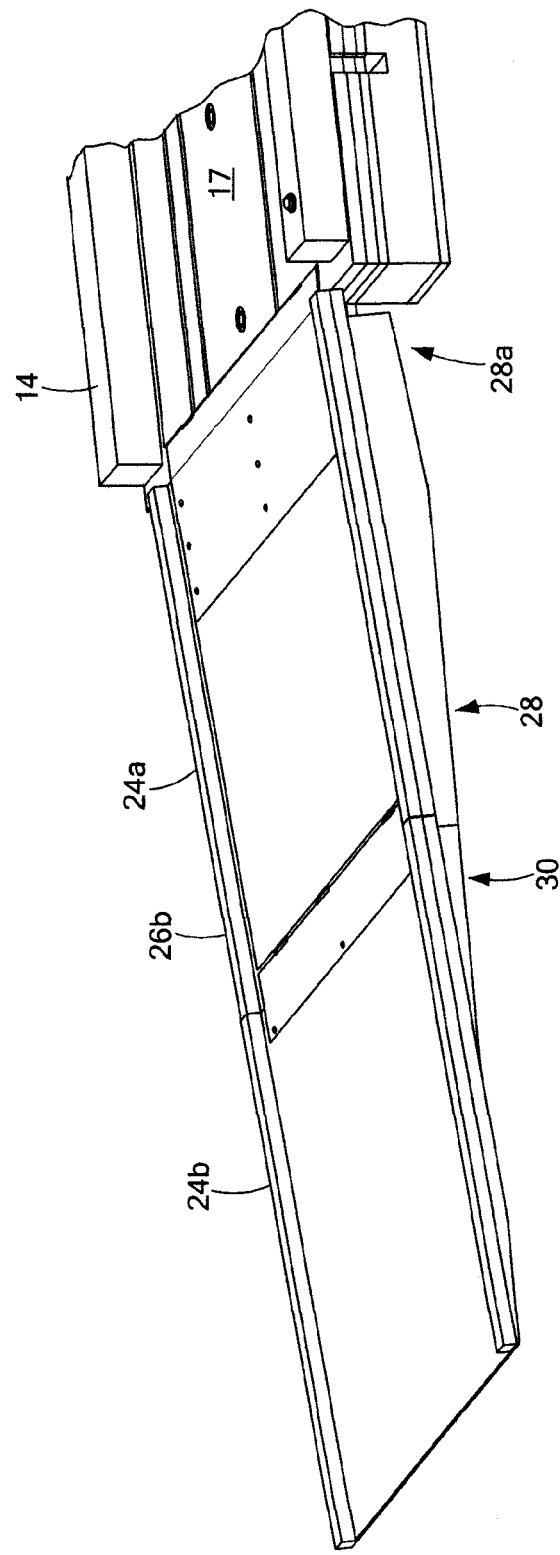

The kit 10 (FIG. 1) includes a plurality of stacked ramp-like members 24a. 24b (FIGS. 5, 6 and 7) disposed over the pallet 14, one of such ramp-like members 24a having one end 26a engageable with one end 28a of the pallet 14 and an opposite end 28b engageable with one end 38a of another one of the ramp-like members 24a, 24b, here member 24b to form, when engaged, an elongated ramp, as shown in FIG. 7.

More particularly, the ramp-like members 24, 24b are here wood and have metal plates 30a, 30b (FIG. 6), respectively, as shown. Metal plate 38a has L-shaped brackets attached to it with fingers 42 that are insertable into slots 44 formed in the pallet 14, as indicated in FIG. 6. Metal plate 38b a has L-shaped brackets attached to it with fingers 48 that are insertable into slots 50 formed in the member 24a, as indicated in FIG. 6. It is noted that the positioning of fingers 42 (i.e., the spatial pattern of fingers 42) is different from the positioning of fingers 48 (i.e., the spatial pattern of fingers 48) so that the ramp-like members 24, 24b are installed correctly. Thus, it is noted that the end 28 of the pallet 14 has two slots 44 and will receive the two fingers 42 of member 24a and will not receive the three fingers 48 of member 24b.

Figure 9:
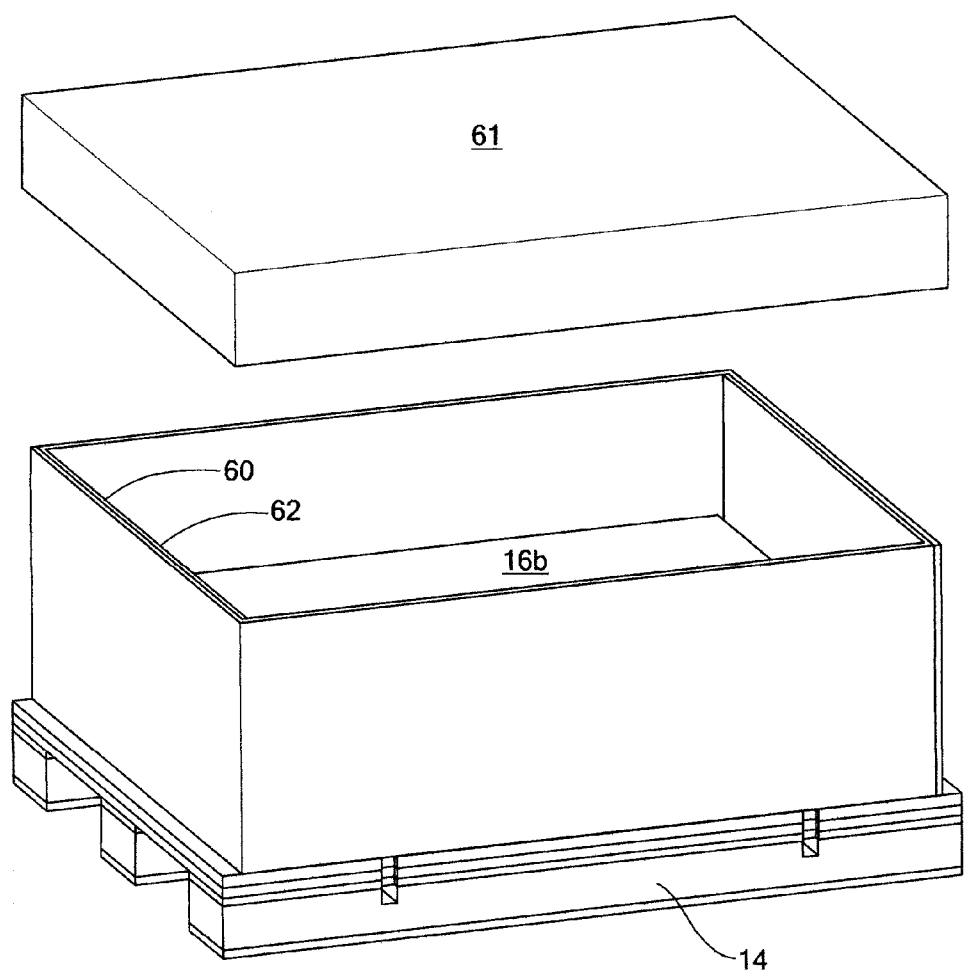
FIG. 9 is a perspective view of outer side panel members of the kit.

The kit 10 includes a pair of opposing outer U-shaped side members 60, 62 (FIG. 1B) disposed, as shown in FIG. 9; about the sides of the pair of folded scored panels (i.e., flat units 16a, 16b); and sides of the plurality of ramp-like members 24a, 24b to provide sidewall portions of shipping package for the kit 10, as indicated in FIGS. 1C and 9.

The kit 10 includes a top member or cover 61 (FIGS. 1C and 8) having a top surface 62 and four side surfaces 64 (only two being shown in FIG. 1C), the cover 61 being disposed over: the pallet 14; the pair of scored panels (i.e., flat units 16a, 16b); and the plurality of ramp-like members 24a, 24b. The cover 61 provides a top cover of the shipping package for the kit 10 as indicated on the right portion of FIG. 1C.

Figure 8:
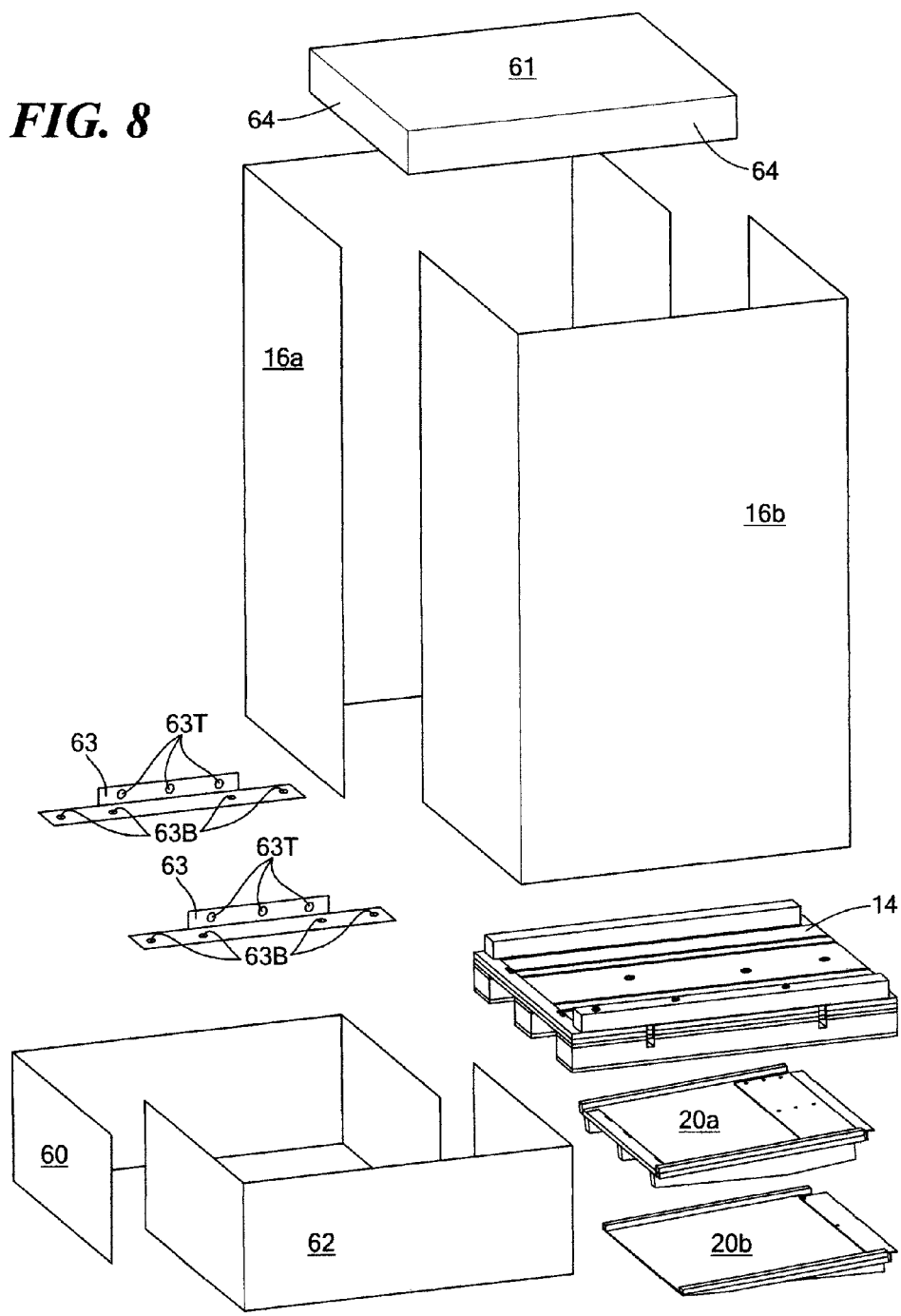
FIG. 8 as an exploded view of the kit with side panel members thereof shown in an unfolded condition.

Referring to FIG. 8, the kit 10 includes a pair of mounting brackets 63. The top portion of the bracket 63 has three holes 63T for fastening to the bottom of the cabinet and four holes 63B for fastening to the top surface 17 (FIG. 7) of the pallet 14.

Figure 5:
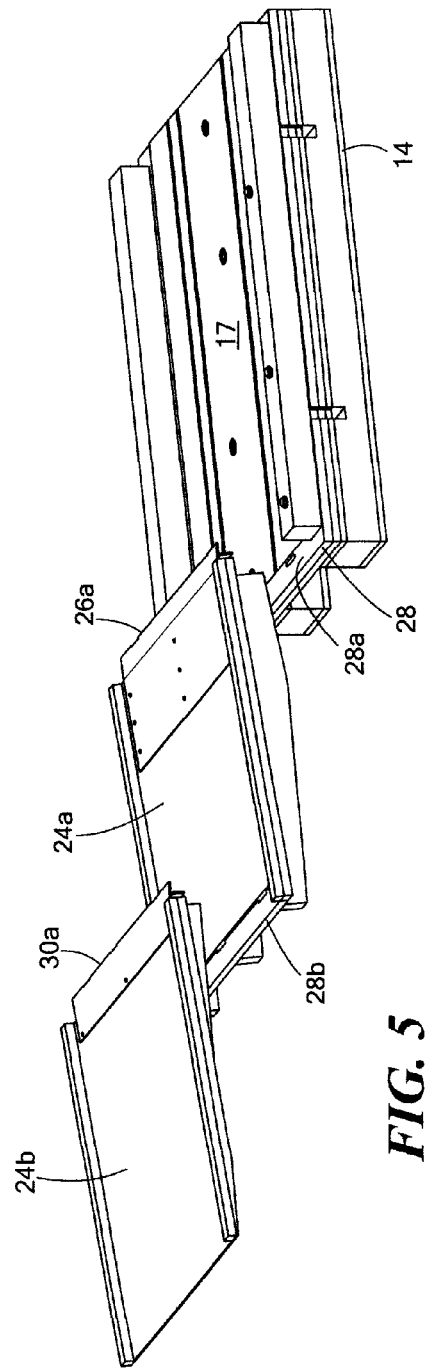
FIGS. 5, 6 and 7 are perspective views of a pair of ramp-like members of the kit at various stages in the assembly thereof to form a ramp used to transport an electrical cabinet to and from the pallet.

Consider first the case when the buyer returns the cabinet to the seller. The seller transports the kit 10, shown in the right portion of FIG. 1C, to the buyer. After the kit 10 arrives at the buyer, the cover 61 and outer side members 60 and 62 are removed. The ramp-like members 24a, 24b are attached one to the other by inserting the 30a end into the 28b end as shown in FIG. 5. The top of the ramp, 26a, is then attached to the end of the pallet 14 to form an extended ramp, as described above in connection with FIGS. 5, 6 and 7. The cabinet 12 (FIG. 2) is then conveyed up the extended ramp onto the top surface 17 (FIG. 7) of the pallet 14. Next, the ramp-like members 24a, 24b are removed from the pallet 14 and from each other. The folded panels 16a, 16b are unfolded as indicated in FIG. 2. The ramp-like members 24a, 24b are rested against the side of the cabinet 12, as indicated in FIG. 2. Next, the panels 16a, 16b, cover 61, and pallet 14 are strapped together with straps 70 (FIG. 10), with the straps 70 passing through spaces 72 in the bottom of the pallet 14, as indicated in the left portion of FIG. 1C and in FIG. 10 for shipment pack to the seller.

Figure 10:
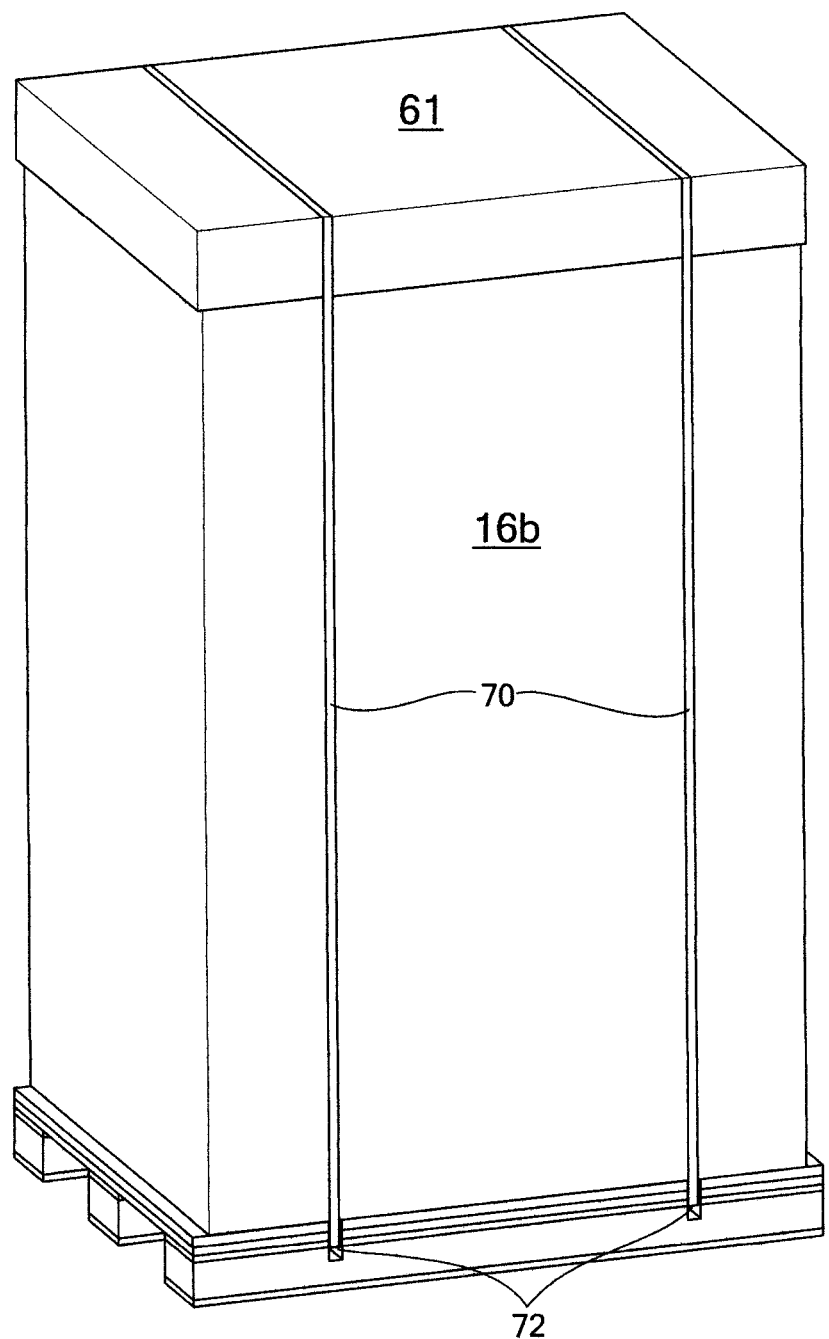
FIG. 10 is a view of a shipping carton assembled from the kit for transportation of an electrical cabinet between a buyer and a seller.

Considering now the case where the seller transports the cabinet to the buyer, there the cabinet is packaged as shown in FIG. 10. As noted above, the ramp-like members 24a, 24b are rested against the side of the cabinet 12, as indicated in FIG. 2. After arriving at the buyer, the cover 61 and outer side panels 16a and 16b (FIG. 2) are removed. The ramp-like members 24a, 24b are assembled and the cabinet is removed from the pallet 14. The side panels 16a, 16b are then folded along the scores 20 (FIG. 4) and the kit 10 is formed as described above (as when it was formed (the left portion of FIG. 1C) for shipment to the buyer in the case where the cabinet was to be returned to the seller), for return of the kit 10 to the seller, for example.

A number of embodiments of the disclosure have been described. Nevertheless, it will be understood that various modifications may be made without departing from the spirit and scope of the disclosure. For example, different heights for the side panels 16a, 16b may be used and different arrangements of shock absorbing material and configurations may be used. Further, the shock absorbing material may be an array of blocks, for example nine blocks; one at each corner of the bottom surface of the pallet 14, four blocks disposed along the edges of the bottom surface of the pallet 14 mid-way between the blocks on the corners, and one in the center of the bottom surface of the pallet 14. Accordingly, other embodiments are within the scope of the following claims.

What is claimed is:

1. A kit for shipping an electrical cabinet, comprising:
   a pallet for supporting the cabinet;
   a pair of scored panels, such scored panels being folded along the scores into a pair of flat units, the folded, flat units being disposed over the pallet, such scores being arranged to provide, when the units are unfolded, a pair of opposing outer U-shaped side coverings for the cabinet;
   a plurality of ramp-like members stacked one over the other and disposed over the pallet, one of such ramp-like members having one end engageable with one end of the pallet and an opposite end engageable with one end of another one of the ramp-like members to form, when engaged, an elongated ramp;
   wherein each of the plurality of ramp-like members is enabled to be separable from each other of the plurality of ramp-like members; and
   a pair of mounting brackets disposed within the kit, wherein the pair of mounting brackets are enabled to fasten the cabinet to the pallet.

2. The kit recited in claim 1 including a pair of opposing outer U-shaped side members disposed about: sides of the pallet; sides of the pair of folded, flat units: and sides of the plurality of ramp-like members to provide sidewall portions of the kit.

3. The kit recited in claim 2 including a top member having a top surface and four side surfaces, the top member being disposed over the pallet, the pair of folded, flat units, and the plurality of ramp-like members, the cover having sides disposed on side portions of the pair of opposing outer U-shaped side members to provide a top cover of the kit.

4. The kit recited in claim 1 wherein a first one of the ramp-like members has a first end configured for insertion into only the pallet and wherein a second one of the ramp like members has an end configured for insertion only into a second end of the first one of the ramp-like members.

5. The kit recited in claim 3 including straps to fasten the pallets to the top cover with the pallets provide a bottom of the kit.

6. The kit recited in claim 5 wherein the pallets have spaces to receive the straps.

7. A shipping carton for an electrical cabinet, comprising:
   a pallet for supporting the cabinet;
   a pair of scored panels, such scored panels being folded along the scores into a pair of flat units, the folded, flat units being disposed over the pallet, such scores being arranged to provide, when the units are unfolded, a pair of opposing outer U-shaped side coverings for the cabinet;

a plurality of stacked ramp-like members disposed over the pallet, one of such ramp-like members having one end engageable with one end of the pallet and an opposite end engageable with one end of another one of the ramp-like members to form, when engaged, an elongated ramp; a first one of the ramp-like members has a first end configured for insertion into only the pallet and wherein a second one of the ramp-like members has an end configured for insertion only into a second end of the first one of the ramp-like members;

wherein each of the plurality of stacked ramp-like members is enabled to be separable from each other of the plurality of stacked ramp-like members;

a pair of mounting brackets disposed within the kit, wherein the pair of mounting brackets are enabled to fasten the cabinet to the pallet;

a pair of opposing outer U-shaped side members disposed about: sides of the pallet; sides of the pair of folded flat units in the folded configuration and sides of the plurality of ramp-like members to provide sidewall portions of the container;

a top member having a top surface and four side surfaces, the top member being disposed over the pallet, the pair of folded, flat units, and the plurality of ramp-like members, the cover having sides disposed on side portions of the pair of opposing outer U-shaped side members to provide a top cover of the container, and straps to fasten the pallets to the top cover with the pallets provide a bottom of the container, such straps passing between the pallet, around the side members and top member.

* * * * *